Figure 1:
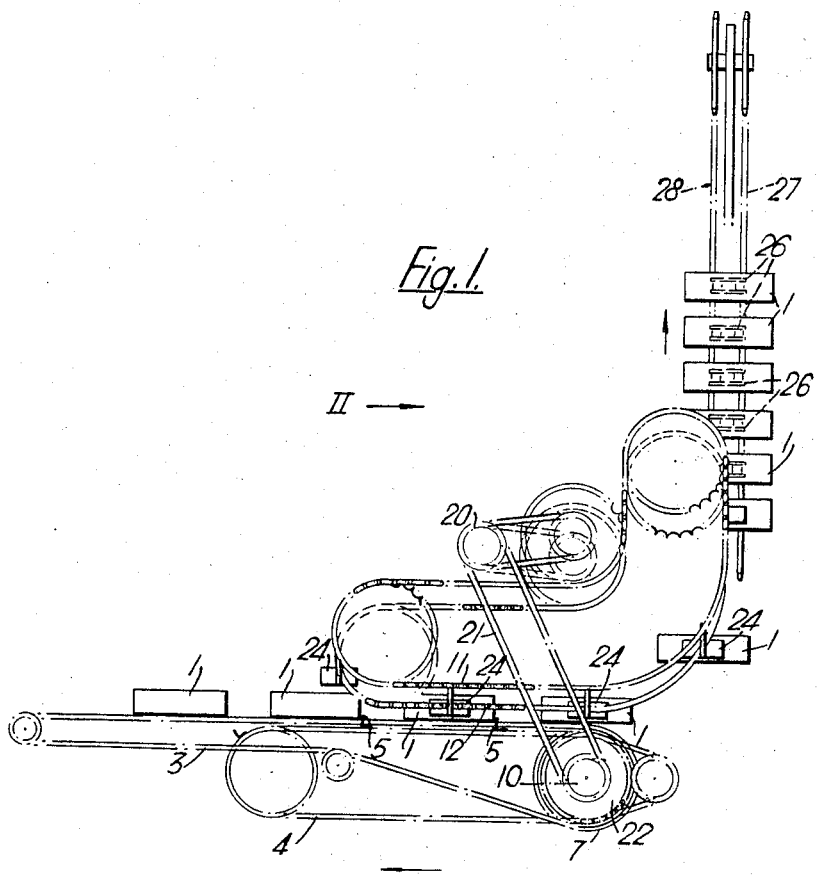

April 18, 1967  M. H. C. BUTTERY ET AL  3,314,518

CONVEYOR MECHANISM FOR CAN BODIES

Filed March 20, 1964  10 Sheets-Sheet 1

Inventors
MICHAEL HARCOURT CHRISTIANS BUTTERY
& FREDERICK DANIEL BROOKES
By
Mason, Porter, Diller & Stewart
Attorneys April 18, 1967  M. H. C. BUTTERY ETAL  3,314,518
CONVEYOR MECHANISM FOR CAN BODIES
Filed March 20, 1964  10 Sheets-Sheet 2

Inventors
MICHAEL HARCOURT CHRISTIANS BUTTERY
& FREDERICK DANIEL BROOKES
By Mason, Porter, Diller & Stewart
Attorneys

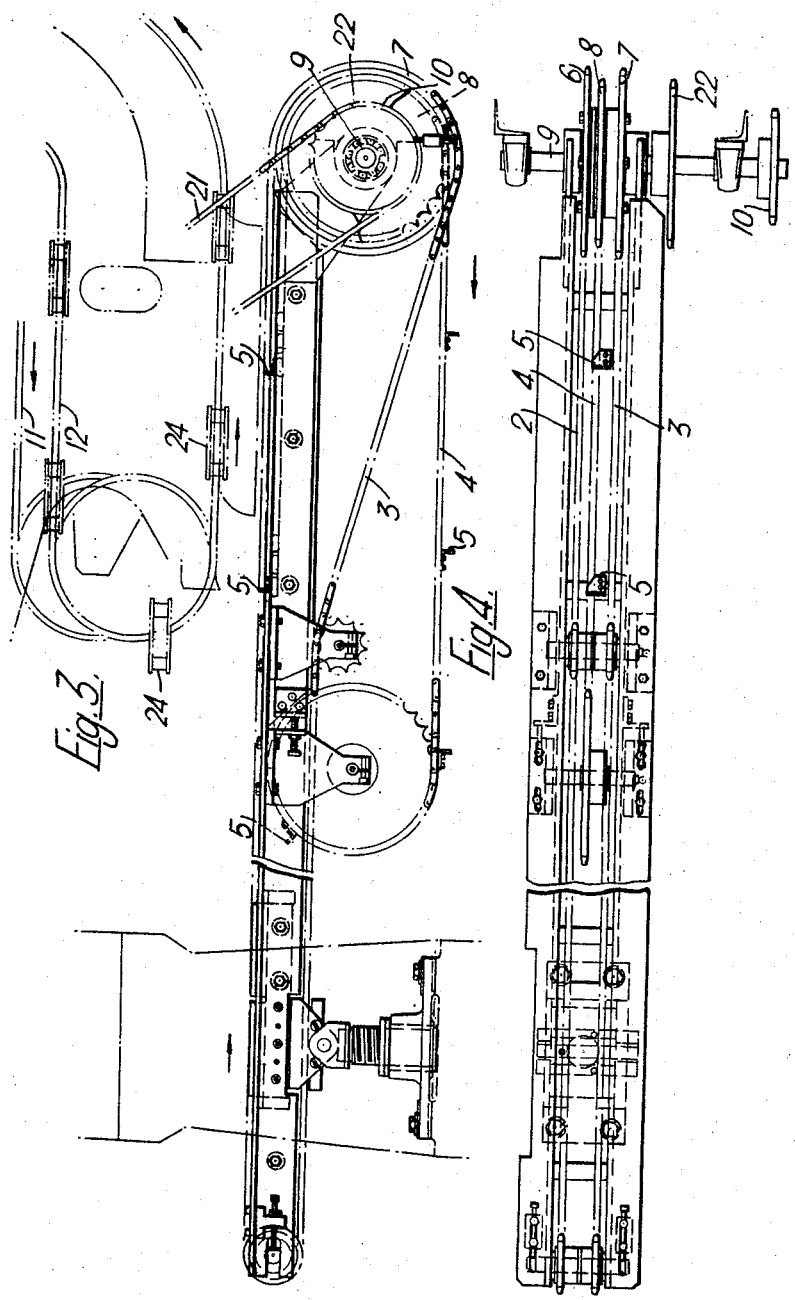

April 18, 1967    M. H. C. BUTTERY ETAL    3,314,518
CONVEYOR MECHANISM FOR CAN BODIES
Filed March 20, 1964    10 Sheets-Sheet 4
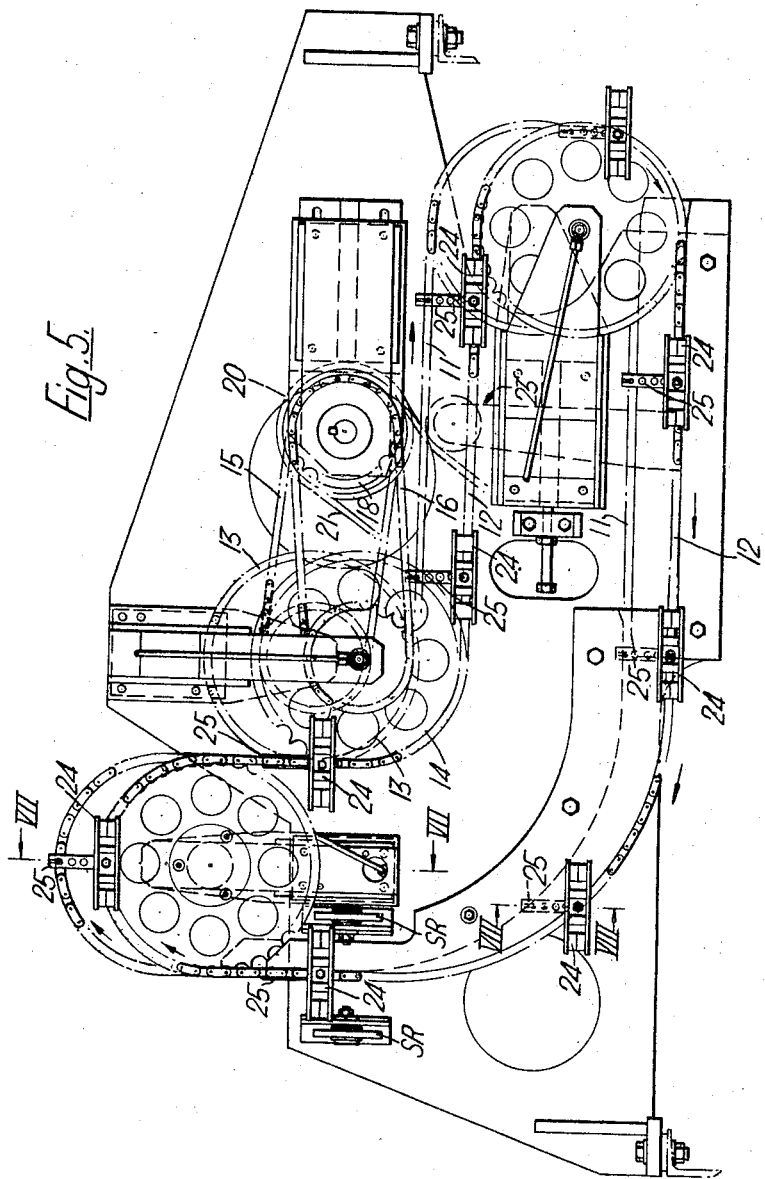
Inventors
MICHAEL HARCOURT CHRISTIANS BUTTERY
& FREDERICK DANIEL BROOKES
By
Mason, Porter, Diller & Stewart
Attorneys April 18, 1967  M. H. C. BUTTERY ETAL  3,314,518
CONVEYOR MECHANISM FOR CAN BODIES
Filed March 20, 1964  10 Sheets-Sheet 5
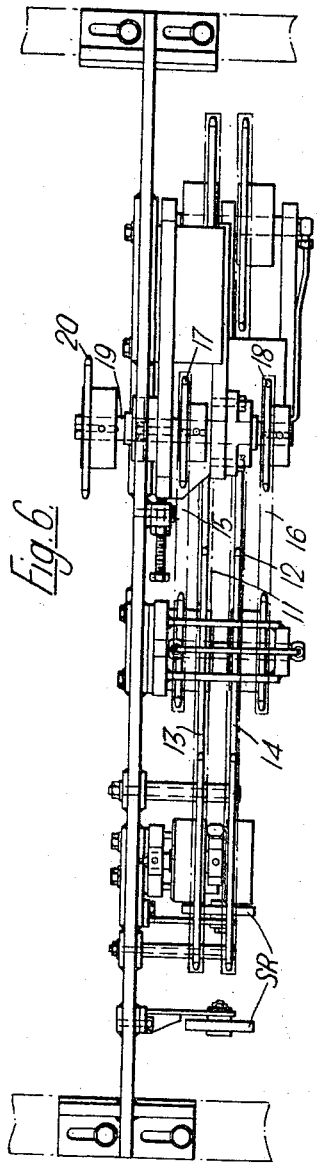
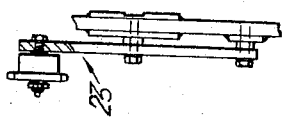
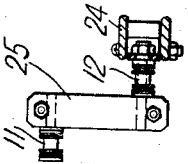
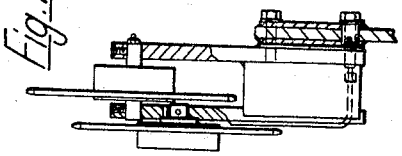
Inventors
MICHAEL HARCOURT CHRISTIANS BUTTERY
& FREDERICK DANIEL BROOKES
By
Mason, Porter, Diller & Stewart
Attorneys

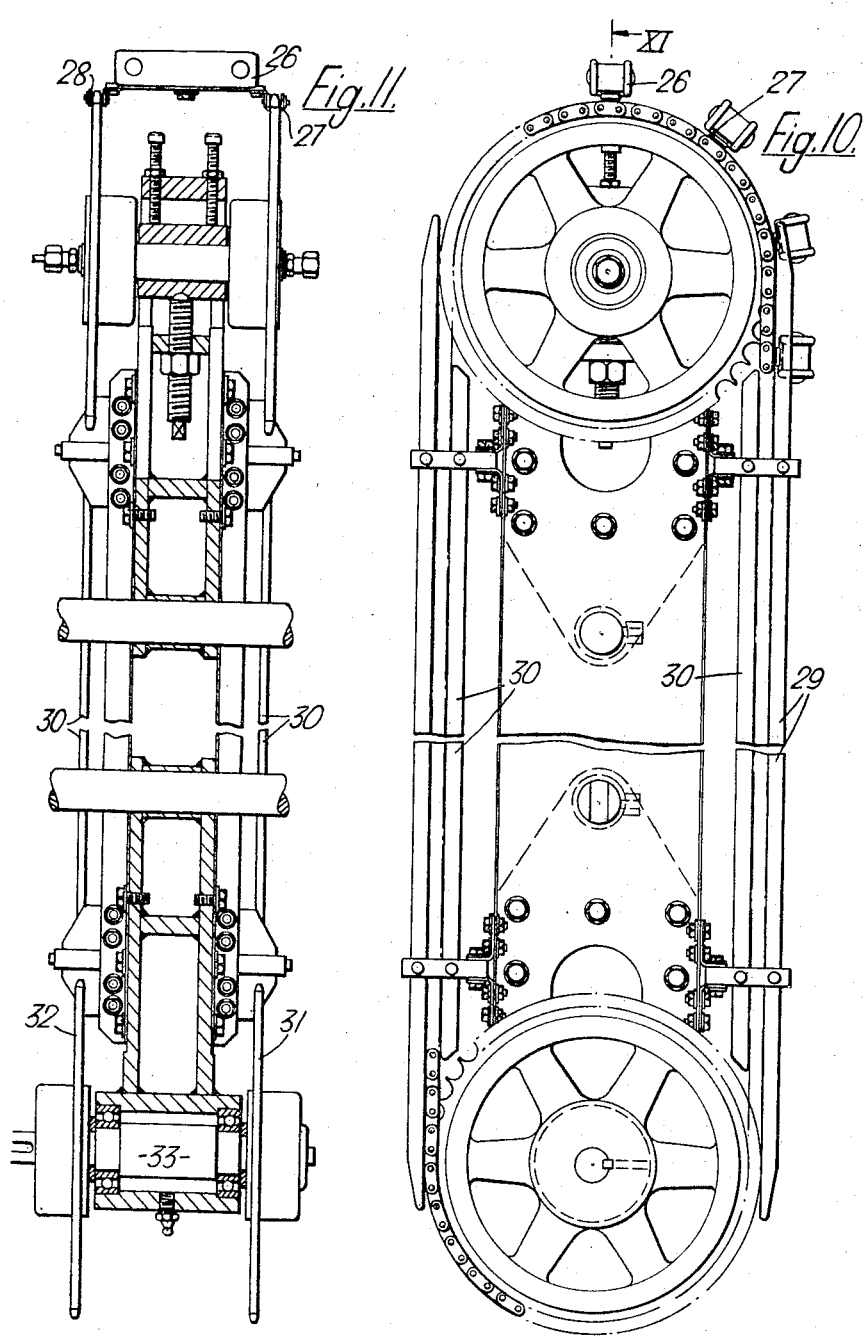

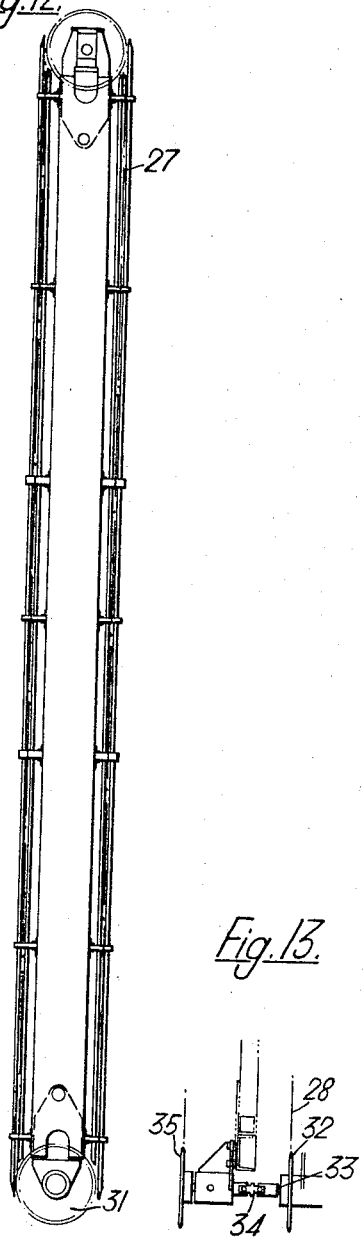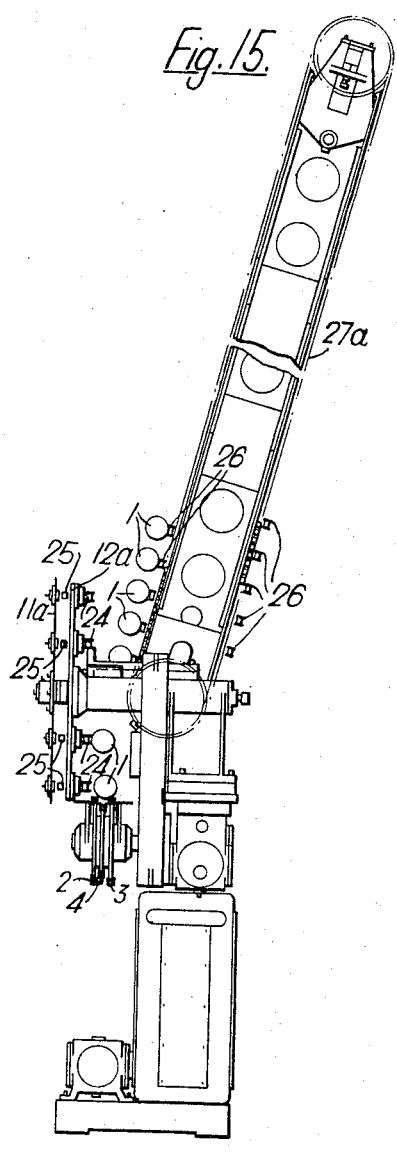

April 18, 1967 M. H. C. BUTTERY ETAL 3,314,518
CONVEYOR MECHANISM FOR CAN BODIES
Filed March 20, 1964 10 Sheets-Sheet 8

Inventors
MICHAEL HARCOURT CHRISTIANS BUTTERY
& FREDERICK DANIEL BROOKES
By
Mason, Porter, Diller & Stewart
Attorneys

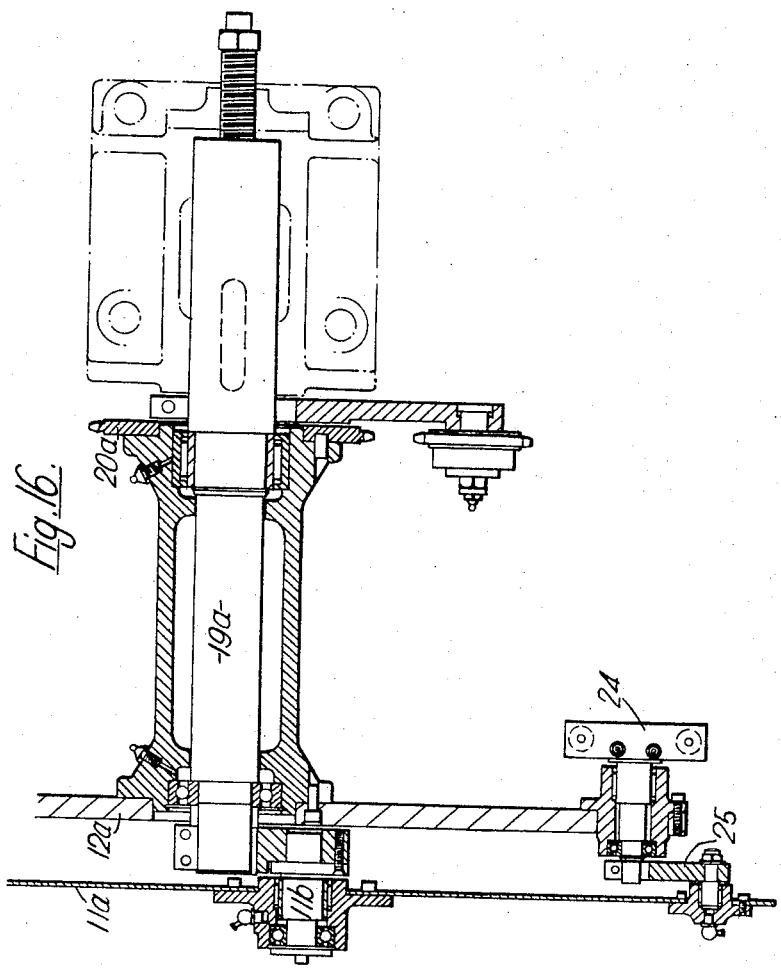

April 18, 1967  M. H. C. BUTTERY ETAL  3,314,518
CONVEYOR MECHANISM FOR CAN BODIES
Filed March 20, 1964  10 Sheets-Sheet 10
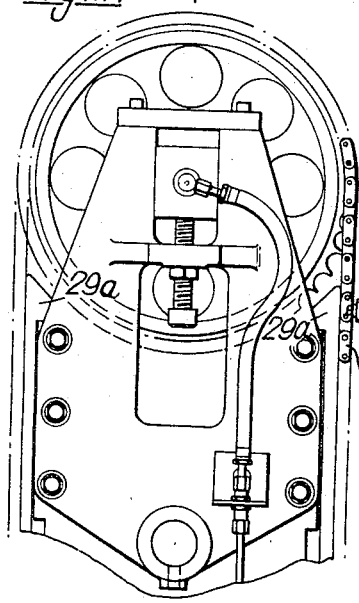
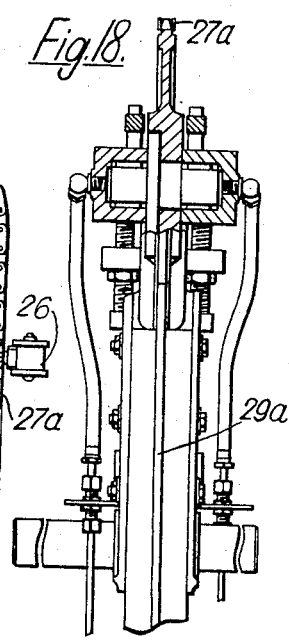
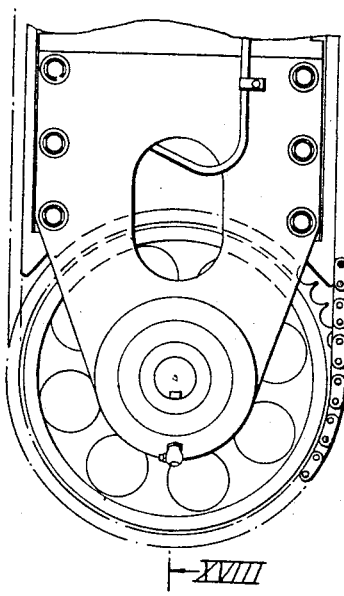
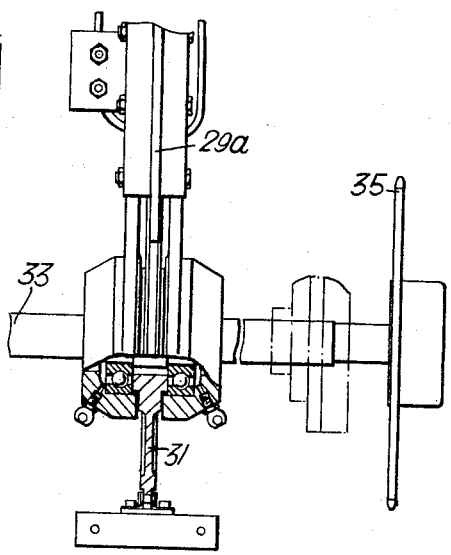
*Inventors*
MICHAEL HARCOURT CHRISTIANS BUTTERY
& FREDERICK DANIEL BROOKES
*By* Mason, Porter, Diller & Stewart
*Attorneys*

United States Patent Office 3,314,518
Patented Apr. 18, 1967

3,314,518
CONVEYOR MECHANISM FOR CAN BODIES
Michael Harcourt Christians Buttery, Bushey Heath, and Frederick Daniel Brookes, Pinner, Middlesex, England, assignors to The Metal Box Company Limited, London, England, a British company
Filed Mar. 20, 1964, Ser. No. 353,416
12 Claims. (Cl. 198—20)

This invention relates to conveyor mechanism for can bodies, for example for use in conveying the bodies away from body-making apparatus.

Can bodies leave a body-making apparatus in a horizontal condition on a conveyor and it is usually desired to remove the bodies from this conveyor and to transfer them to a secondary conveyor which is movable in a vertical direction. This operation is usually effected in a random manner by simple transfer devices.

It is a main object of the present invention to provide a conveyor mechanism for can bodies leaving a body-forming apparatus which is capable of maintaining the bodies under complete control.

According to the invention there is provided conveyor mechanism for can bodies comprising a conveyor arranged to move can bodies in succession with the axes thereof substantially co-axial and in spaced axial relation, primary transfer devices supported for movement substantially at the linear speed of the conveyor and arranged to remove the bodies from the conveyor and to change the orientation of the axes of the bodies from substantially co-axial to one over another, and secondary transfer devices movable in timed relation with the primary transfer devices and arranged to receive bodies therefrom and to continue the movement thereof in a vertical plane with their axes one over the other.

The primary transfer devices may be supported for movement with first and second conveyor elements movable in one direction in parallel offset paths, the transfer devices being connected with said conveyor elements by links located between and pivotally connected to the conveyor elements thereby to maintain the primary transfer devices in horizontal positions at all points along the travel thereof.

The primary transfer devices may be arranged to remove the bodies from the conveyor while maintaining the axes of the bodies in one vertical plane and the secondary transfer devices arranged to continue the movement of the bodies with the axes thereof in a vertical plane parallel with that in which they are moved by the primary transfer devices.

In one embodiment of the invention the first and second conveyor elements each consists of an endless chain movable in a substantially L-shaped path, the first chain being movable in a path higher than that of the second chain.

In another embodiment of the invention the primary transfer devices may be supported in spaced relation by a rotatable carrier therefor, and the carrier may comprise first and second conveyor elements consisting of first and second discs rotatable in unison with the second disc concentric with the axis of rotation and the first disc eccentric to the axis of rotation.

The primary and secondary transfer devices may be magnets, and may be permanent magnets. When the transfer devices are magnets the mechanism may include stripper means operable at the position of transfer of the bodies from the primary to the secondary magnets to strip the bodies from the primary magnets for engagement by the secondary magnets. The stripper means may comprise a rotatable device and in one embodiment of the invention the stripper means consists of at least one rotatable roller the periphery of which is engageable with a body carried by a primary magnet and arranged to disengage the body from the primary magnet.

The secondary transfer devices may be movable at a linear speed less than that of the primary transfer devices and the pitch between the secondary transfer devices correspondingly less than that between the primary transfer devices.

Figure 2:
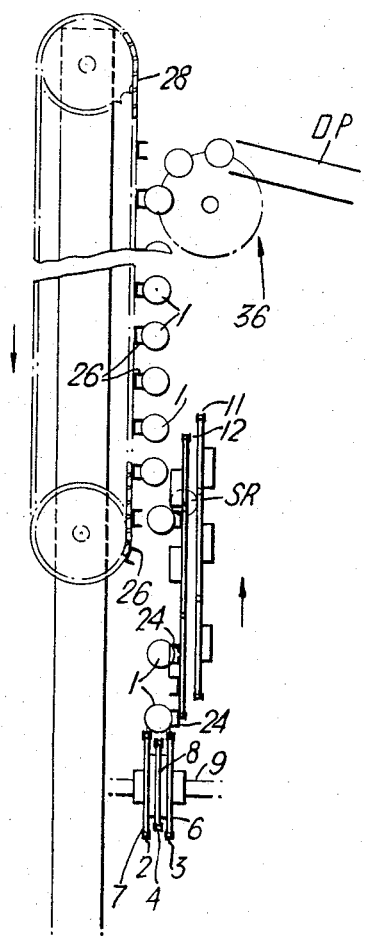

In order that the invention may be clearly understood two embodiments thereof will now be described, by way of example, with reference to the accompanying drawings, in which:

FIGURE 1 is a simplified diagrammatic illustration of one embodiment of the invention, FIGURE 2 is a view looking in the direction of arrow II, FIGURE 1, FIGURE 3 is a side elevation of a conveyor for moving can bodies to a position of engagement thereof by primary magnets, FIGURE 4 is a top plan of FIGURE 3, FIGURE 5 is side view of the form of primary magnet conveyor diagrammatically illustrated in FIGURE 1, FIGURE 6 is a top plan of FIGURE 5, FIGURE 7 is a part section on line VII—VII, FIGURE 5, FIGURE 8 is a part section, partly in elevation, on line VIII–VIII, FIGURE 5, FIGURE 9 illustrates a chain tensioning device shown in FIGURE 5, FIGURE 10 is a broken elevation of the conveyor for secondary magnets shown in FIGURE 1, FIGURE 11 is a section, partly in elevation, on line XI—XI, FIGURE 10.

Figure 14:
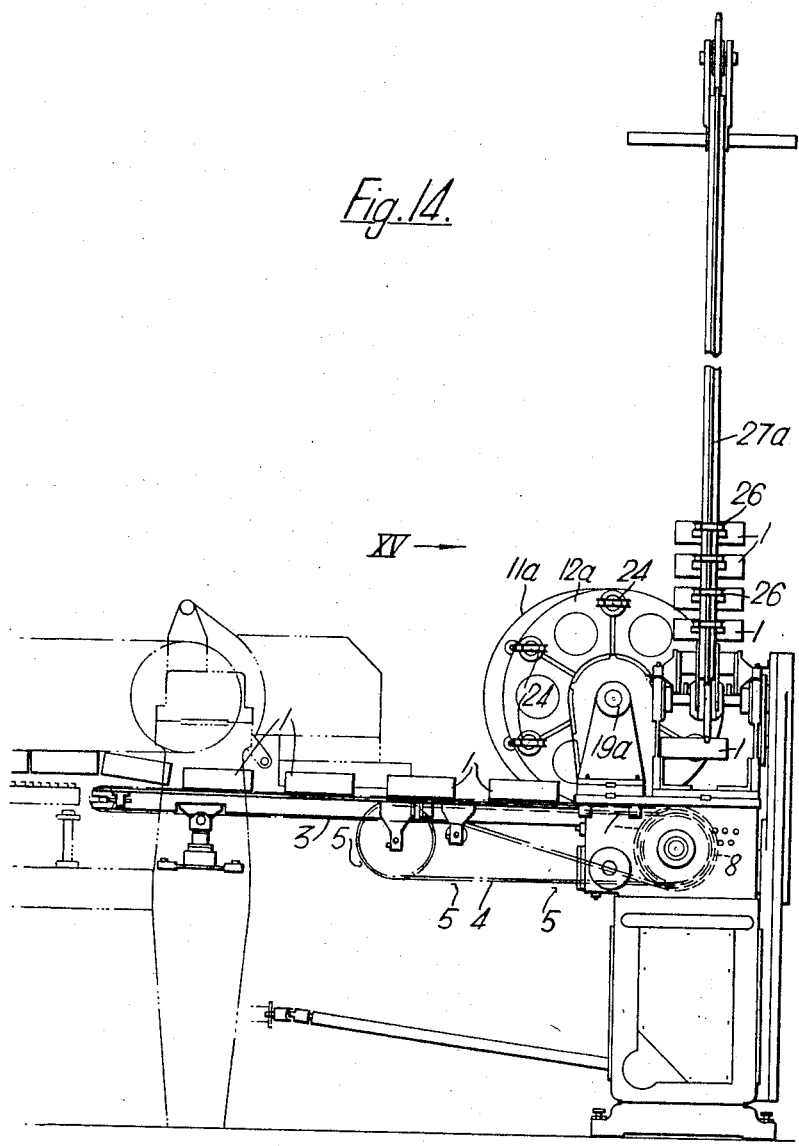

FIGURE 12 is a side view of FIGURE 10,

FIGURE 13 is a view of a detail looking in the direction of arrow XIII, FIGURE 12, FIGURE 14 is a diagrammatic side elevation of a second embodiment of the invention, FIGURE 15 is an end view of FIGURE 14 looking in the direction of arrow XV, FIGURE 14, FIGURE 16 is a view, partly in section, of a part of the primary magnet conveyor embodied in the apparatus of FIGURE 14, FIGURE 17 is a broken elevation of the conveyor for secondary magnets shown in FIGURES 14 and 15, and FIGURE 18 is a section, partly in elevation, on line XVIII–XVIII, FIGURE 17.

In the drawings like reference numerals refer to like or similar parts.

Referring to FIGURES 1 to 13 of the drawings, can bodies 1, FIGURES 1 and 2, leaving a body-making apparatus, not shown, are delivered to a conveyor, which includes chains 2, 3, FIGURE 4, arranged to move the bodies in succession with the axes thereof substantially co-axial and in spaced relation as shown in FIGURE 1. The conveyor 2, 3 may be moved at a greater linear speed than that at which the bodies 1 are delivered from the body-making apparatus so that the bodies are spaced apart axially. The bodies 1 are more accurately spaced by delivering them axially to a second part of the conveyor formed by a chain 4 provided with locating elements 5 against which the leading ends of the bodies abut due to the linear speed of the chain 4 being slightly less than that of the first part 2, 3 of the conveyor. The chains 2, 3, 4 respectively pass round sprocket wheels 6, 7, 8 all of which are rotatable with a shaft 9 driven by a sprocket wheel 10 from a source not shown.

Alongside the slower moving portion 4 of the conveyor there are arranged a pair of endless chains, consisting of a first chain 11 and a second chain 12, FIGURES 5 and 8, movable in substantially L-shaped paths spaced apart laterally and disposed at different heights to be offset in parallel vertical planes. The chains 11, 12 respectively pass round sprocket wheels 13, 14 which are respectively rotated by chains 15, 16 from sprocket wheels 17, 18 rotatable with a shaft 19 which in turn is rotated by a sprocket wheel 20, chain 21, FIGURE 6, and sprocket wheel 22 rotatable with the shaft 9. The chain 21 is tensioned by a tensioning device 23, FIGURES 5 and 9.

A series of primary transfer devices shown as permanent magnets 24 is connected to the endless chains 11, 12 by links 25 pivotally connected to the chains at the positions of connection of the primary magnets thereto. The magnets 24 are equi-spaced along the chains 11, 12 and are maintained thereby in horizontal positions at all points along the travel thereof. The chains 11, 12 move each primary magnet 24 in a horizontal and a vertical direction, the horizontal part of the path being parallel with that in which the bodies 1 are moved axially by the conveyor 2, 3, 4. The primary magnets 24 are moved at substantially the linear speed of the slower portion 4 of the conveyor and are timed to be aligned alongside bodies 1 being moved by the portion 4 of the conveyor so that a body aligned with a primary magnet 24 is attracted thereby and is moved sideways into engagement with the primary magnet which then continues the axial movement of the body until the chains change direction into the vertical portions of their L-shaped paths. The change of direcion is effected through a quadrant of a circle and as the primary magnets 24 change direction the bodies 1 are moved thereby in an upward direction at right angles to the axes thereof. During the movement of the bodies 1 by the primary magnets 24 in the said horizontal and vertical directions the axes of the bodies 1 are maintained in one vertical plane but the orientation of the axes is changed from substantially co-axial to one over the other, as indicated in FIGURE 1.

A series of secondary transfer devices shown as permanent magnets 26 is carried by a further endless chain conveyor consisting of two chains 27, 28 movable in a vertical plane parallel with the planes in which the vertical portions of the above-mentioned chains 11, 12 are movable and the secondary magnets 26 are equi-spaced along the chains 27, 28 and are moved thereby in timed relation with the primary magnets 24. At a predetermined position a secondary magnet 26 is aligned, see FIGURE 2, alongside a primary magnet 24 moving a body 1 vertically and at this position stripper means is operable to strip the body 1 from the primary magnet 24 so that it is attracted to and engaged with the aligned secondary magnet 26 which then continues the vertical movement of the body 1 but with the axis thereof located in a vertical plane parallel with that in which it was moved by the primary magnet. As shown in the drawings, the stripper means consists of freely rotatable rollers SR, FIGURES 2, 5 and 6, the peripheries of which are engageable with a body 1 carried by the primary magnet 24 and which are arranged to disengage the body 1 from the primary magnet 24.

The chains 27, 28 pass between guide rails 29, 30, FIGURES 10 and 11, and at their lower ends around driving sprocket wheels 31, 32 rotatable with a drive shaft 33 connected by a universal joint 34, FIGURE 13, with a driving chain wheel 35 driven from a source not shown.

If desired the primary and secondary magnets 24, 26 may be moved at substantially the same linear speed but in a preferred embodiment of the invention the secondary magnets 26 are moved at a linear speed less than that of the primary magnets 24. For example, the secondary magnets 26 may have a linear speed one-third that of the primary magnets 24 in which event the pitch between the secondary magnets is one-third that between the primary magnets.

The bodies 1 being conveyed by the secondary magnets 26 can be transferred therefrom to a turret 36, FIGURE 2, for example to an electromagnetic turret, by which they can be delivered to a chute DP for delivery to a further machine in which a further operation is carried out on the bodies.

The secondary magnets 26 and the conveyor 27, 28 therefor may, in the event of a stoppage downstream of the path to which the bodies are transferred from the secondary magnets, be employed as a storage device pending the clearance of the stoppage.

FIGURES 14 to 18 illustrate a modified embodiment of the apparatus described above, the primary differences residing in an alternative construction for the primary and secondary magnet conveyors. The mode of operation of the apparatus is basically the same as that of the apparatus described above with reference to FIGURES 1 to 13.

Referring to FIGURES 14 to 18, bodies 1 are delivered to the primary magnets 24 by a conveyor 2, 3, 4 as described above and the primary magnets 24 are supported by a conveyor consisting of a rotatable carrier formed by first and second discs 11a, 12a of which the second disc 12a is concentric with and is rotatable about a fixed shaft 19a by the sprocket wheel 20a, FIGURE 16. The discs 11a, 12a are supported in spaced axial relation and the first disc 11a is carried by a spindle 11b, FIGURE 16, eccentric to shaft 19a. The primary magnets 24 are connected with the discs 11a, 12a by links 25 which are located between the discs 11a, 12a. It will be understood that with this form of conveyor the primary magnets 24 are moved in a circular path while being maintained in horizontal positions at all points along the travel thereof.

The secondary magnets 26 are carried by a second conveyor consisting of a single chain 27a which runs over a guide rail 29a and stripper means, not shown, may be provided to strip a body 1 from a primary magnet 24 so that it is attracted to a secondary magnet 26.

In FIGURE 14 the bodies 1 are shown being delivered to the conveyor 2, 3, 4 from a body making machine by a magnetic conveyor of the kind described in British patent specification No. 881,962.

It will be understood that in each embodiment of the invention the magnets 24, 26 may, if desired, instead of being permanent magnets be electromagnets and that the transfer devices instead of being magnets may be other devices, for example vacuum pads, arranged to grip the bodies and transfer them in the manner herein described.

In the foregoing description the apparatus has been described with reference to the use thereof in conveying can bodies away from a body-making apparatus, it is to be understood, however, that the apparatus can be employed for conveying cans either before or after filling and closing thereof and the term "can bodies" as used herein and in the appended claims is deemed to include such cans.

We claim:

1. Conveyor mechanism for can bodies comprising a conveyor arranged to move can bodies in succession with the axes thereof substantially co-axial and in spaced axial relation primary transfer devices supported for movement substantially at the linear speed of the conveyor and arranged to fixedly engage and remove the bodies from the conveyor and to change the displacement of the axes of the bodies from substantially co-axial to one over another; said primary transfer devices including means for maintaining the axes of the bodies parallel to one another, and secondary transfer devices movable in timed relation with the primary transfer devices and arranged to receive bodies therefrom and to continue the movement thereof in a vertical plane with their axes one over the other; all of said transfer devices being adapted to retain the can bodies in substantially one vertical plane.

2. Conveyor mechanism according to claim 1, wherein the primary transfer devices are supported for movement with first and second conveyor elements movable in one direction in parallel offset paths and are connected with said conveyor elements by links located between and pivotally connected to the conveyor elements thereby to maintain the primary transfer devices in horizontal positions at all points along the travel thereof.

3. Conveyor mechanism for can bodies comprising a conveyor arranged to move can bodies in succession with the axes thereof substantially co-axial and in spaced axial relation, primary transfer devices supported for movement substantially at the linear speed of the conveyor and arranged to remove the bodies from the conveyor and to change the displacement of the axes of the bodies from substantially co-axial to one over another; said primary transfer devices including means for maintaining the axes of the bodies parallel to one another, and secondary transfer devices movable in timed relation with the primary transfer devices and arranged to receive bodies therefrom and to continue the movement thereof in a vertical plane with their axes one over the other, wherein the primary transfer devices are supported for movement with first and second conveyor elements movable in one direction in parallel offset paths and are connected with said conveyor elements by links located between and pivotally connected to the conveyor elements thereby to maintain the primary transfer devices in horizontal positions at all points along the travel thereof, wherein the primary transfer devices remove the bodies from the conveyor while maintaining the axes of the bodies in one vertical plane and the secondary transfer devices continue the movement of the bodies with the axes thereof in a vertical plane parallel with that in which they are moved by the primary transfer devices.

4. Conveyor mechanism according to claim 3, wherein the first and second conveyor elements each comprises an endless chain movable in a substantially L-shaped path, the first chain being movable in a path higher than that of the second chain.

5. Conveyor mechanism according to claim 1, wherein the primary transfer devices are supported in spaced relation by a rotatable carrier therefor.

6. Conveyor mechanism according to claim 2, wherein the first and second conveyor elements include first and second discs rotatable in unison with the second disc concentric with the axis of rotation and the first disc eccentric to the axis of rotation.

7. Conveyor mechanism according to claim 2, wherein the primary and secondary transfer devices are magnets.

8. Conveyor mechanism for can bodies comprising a conveyor arranged to move can bodies in succession with the axes thereof substantially co-axial and in spaced axial relation, primary transfer devices supported for movement substantially at the linear speed of the conveyor and arranged to remove the bodies from the conveyor and to change the displacement of the axes of the bodies from substantially co-axial to one over another; said primary transfer devices including means for maintaining the axes of the bodies parallel to one another, and secondary transfer devices movable in timed relation with the primary transfer devices and arranged to receive bodies therefrom and to continue the movement thereof in a vertical plane with the axes one over the other, wherein the primary transfer devices are supported for movement with first and second conveyor elements movable in one direction in parallel offset paths and are connected with said conveyor elements by links located between and pivotally connected to the conveyor elements thereby to maintain the primary transfer devices in horizontal positions at all points along the travel thereof, wherein the primary and secondary transfer devices are magnets and wherein the magnets are permanent magnets.

9. Conveyor mechanism for can bodies comprising a conveyor arranged to move can bodies in succession with the axes thereof substantially co-axial and in spaced axial relation, primary transfer devices supported for movement substantially at the linear speed of the conveyor and arranged to remove the bodies from the conveyor and to change the displacement of the axes of the bodies from substantially co-axial to one over another; said primary transfer devices including means for maintaining the axes of the bodies parallel to one another, and secondary transfer devices movable in timed relation with the primary transfer devices and arranged to receive bodies therefrom and to continue the movement thereof in a vertical plane with the axes one over the other, wherein the primary transfer devices are supported for movement with first and second conveyor elements movable in one direction in parallel offset paths and are connected with said conveyor elements by links located between and pivotally connected to the conveyor elements thereby to maintain the primary transfer devices in horizontal positions at all points along the travel thereof, wherein the primary and secondary transfer devices are magnets and including stripper means operable at the position of transfer of the bodies from the primary to the secondary magnets to strip the bodies from the primary magnets for engagement by the secondary magnets.

10. Conveyor mechanism according to claim 9, wherein the stripper means comprises a rotatable device.

11. Conveyor mechanism according to claim 10, wherein the stripper means consists of at least one rotatable roller the periphery of which is engageable with a body carried by a primary magnet and is arranged to disengage the body from the primary magnet.

12. Conveyor mechanism for can bodies comprising a conveyor arranged to move can bodies in succession with the axes thereof substantially co-axial and in spaced axial relation, primary transfer devices supported for movement substantially at the linear speed of the conveyor and arranged to remove the bodies from the conveyor and to change the displacement of the axes of the bodies from substantially co-axial to one over another; said primary transfer devices including means for maintaining the axes of the bodies parallel to one another, and secondary transfer devices movable in timed relation with the primary transfer devices and arranged to receive bodies therefrom and to continue the movement thereof in a vertical plane with the axes one over the other, wherein the primary transfer devices are supported for movement with first and second conveyor elements movable in one direction in parallel offset paths and are connected with said conveyor elements by links located between and pivotally connected to the conveyor elements thereby to maintain the primary transfer devices in horizontal positions at all points along the travel thereof, wherein the primary and secondary transfer devices are magnets and wherein the secondary transfer devices are movable at a linear speed less than that of the primary transfer devices and the pitch between the secondary transfer devices is correspondingly less than that between the primary transfer devices.

References Cited by the Examiner

UNITED STATES PATENTS

| | | | |
|---|---|---|---|
| 599,568 | 2/1898 | Lewis. | |
| 1,639,435 | 8/1927 | Nilsson | 198—138 |
| 2,610,592 | 9/1952 | Dorsey | 198—158 X |
| 2,643,778 | 6/1953 | Socke | 198—41 X |
| 2,906,239 | 9/1959 | Socke | 198—25 X |
| 2,936,059 | 5/1960 | Hakogi | 198—22 X |
| 2,940,581 | 6/1960 | Chebuhar | 198—41 X |
| 3,039,606 | 6/1962 | Dearsley | 209—111.7 |
| 3,124,231 | 3/1964 | Ott | 198—103 X |

EVON C. BLUNK, *Primary Examiner.*

R. J. HICKEY, *Assistant Examiner.*